Oct. 29, 1963    J. J. ELLIS    3,108,869
ORE REDUCTION FURNACE AND METHOD
Filed Nov. 9, 1960    2 Sheets-Sheet 1

INVENTOR.
Jack J. Ellis,
BY Cromwell, Greist & Warden
Attys

Oct. 29, 1963
J. J. ELLIS
3,108,869
ORE REDUCTION FURNACE AND METHOD
Filed Nov. 9, 1960
2 Sheets-Sheet 2
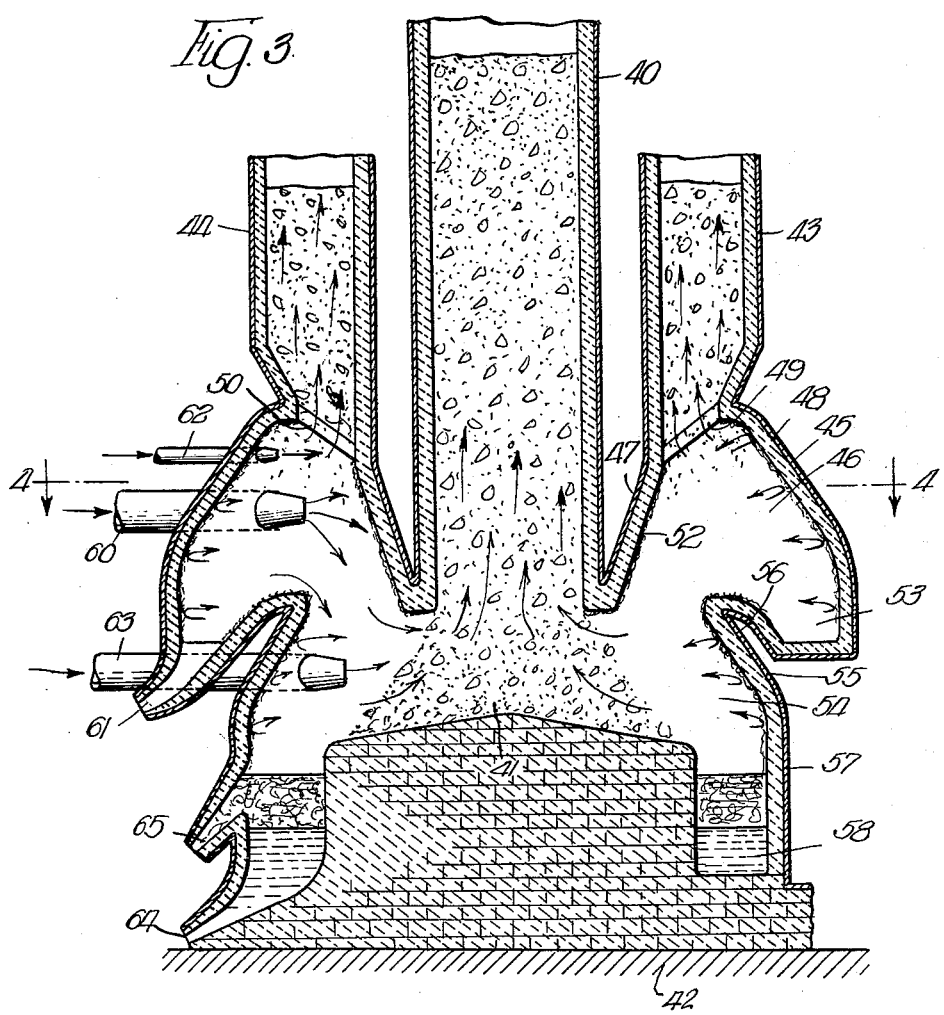
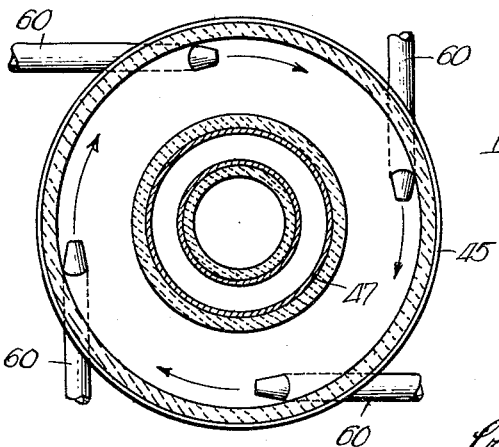
INVENTOR.
Jack J. Ellis,
BY
Cromwell, Greist & Warden
ATTYS.

United States Patent Office 3,108,869
Patented Oct. 29, 1963

3,108,869
ORE REDUCTION FURNACE AND METHOD
Jack J. Ellis, St. Louis County, Mo.
(301 Olive St., St. Louis, Mo.)
Filed Nov. 9, 1960, Ser. No. 68,200
8 Claims. (Cl. 75—41)

This invention relates to methods and apparatus for extracting metals from their ores and is more particularly concerned with improvements in a method and apparatus which is particularly designed for the reduction of iron ores so as to extract therefrom the iron.

It is common practice to extract iron from its ores by a blast furnace process which consists essentially of charging iron ore, fuel in the form of coke, and a flux in the form of limestone and dolomite into the top of a blast furnace and blowing heated air into the material. The ores employed usually contain an iron oxide, either hematite ($Fe_2O_3$) or magnetite ($Fe_3O_4$) with small proportions of other iron oxides present. The ores contain a high percentage of the iron oxide and the balance gangue which consists mostly of silica and alumina, about 12% moisture, and 6% chemically combined water. The limestone and dolomite form, when heated, a fluid slag of a composition which will restrict appropriately the other elements, such as silicon, sulphur, etc. entering into the combination with the pig iron which results from operation of the furnace, these so-called metaloids controlling also, within limitations, the mechanical and chemical properties of the pig iron. The fuel employed in the process has a twofold function: first to supply enough heat to obtain the necessary temperature for the metallurgical reducing and melting reactions to take place, and second, to supply the reducing agent for the purpose of reducing or removing the oxygen from the iron oxide in the ore. Sufficient heat is necessary to reduce and melt practically all of the iron, most of the manganese and a small part of the silicon, and to flux and melt the gangue of the ore and the ash of the coke. The incandescent carbon of the coke is inherently a strong reducing agent. However, it is thought to account for only a small portion of the reduction taking place in the blast furnace. The oxygen of the blast ignites almost immediately upon entering the furnace with the carbon of the coke to form carbon monoxide which accounts for the majority of the reduction.

In the operation of the conventional blast furnace, metallurgical coke is employed which must have certain physical and chemical properties, namely, the strength to support a heavy burden of material, a size sufficient to allow free and uniform flow of ascending furnace gases, and it must be low in sulphur and other undesirable impurities that may contaminate the iron because the coke ash mixes intimately with the molten iron. While high grade cokes having the desirable properties for blast furnace operation are available, they have become increasingly costly and it has long been recognized that considerable economy could be effected in the cost of producing pig iron if cheaper grades of coke could be employed. It is a general object, therefore, of the present invention to provide an improved method of reducing iron ores which is carried out in a new type blast furnace and which permits use of a fine, fragile low cost coke or coal and at the same time results in a more efficient operation of the furnace.

It is a more specific object of the invention to provide a method and apparatus for blast furnace reduction of iron ores which eliminates the need of a high quality coke as a fuel and permits the use of a fine, fragile, medium sulphur coke, char or coal with the fuel being introduced into the furnace separately from the ore and with the fuel ash being trapped separately from the slag produced by the fluxing materials so as to prevent the undesirable impurities in the coke from mixing or combining with the molten iron.

It is a further object of the invention to provide an improved method for reducing iron ore in a blast furnace which permits the use of a fine, fragile coke, char or coal, having substantial quantities of undesirable impurities wherein the coke is added to the furnace in a high pressure hot air stream at the bottom of the stack, with the air and coke mixture being introduced at a plurality of points extending around the periphery of a combustion chamber in the hearth portion of the furnace and tangentially so that the coke is oxidized and the coke ash is converted to molten form without being allowed to comingle with the slag produced by the fluxing materials or the molten iron, and with the coke ash being trapped in a collecting trough extending around the periphery of the hearth from which it may be separately removed.

It is another object of the invention to provide a method and apparatus for a blast furnace reduction of iron ore wherein the iron ore with flux forming material and a small amount of metallurgical coke is fed into the top of the furnace while the major portion of the fuel, consisting of fine, fragile coke, char or coal, is introduced with preheated, high pressure air at a plurality of points tangentially into the combustion area in the hearth portion of the furnace whereby the coke initially impinges and sticks to the layer of slag formed by the ashing of the material consumed previously on the furnace wall and the preheated air sweeping past the coke oxidizes it into carbon monoxide, the ratio of fuel and air being regulated to produce the desired amount of carbon monoxide, and wherein the coke ash, which may consist of undesirable elements, is tapped off separately and does not comingle with the normal impurities associated with iron ores while the products of combustion, mainly carbon monoxide and nitrogen, enter into and ascend through the burden to the top of the furnace and the ore, limestone and coke descend in the furnace with the ore being reduced, the limestone decomposed, and both being preheated and elevated to molten temperature, the molten iron and slag thereby formed dripping down through the interstices in the coke to the hearth and accumulating therein separate layers due to the difference in density.

It is a still further object of the invention to provide a method and a furnace for reducing ores wherein fuel and hot air are introduced in a manner which allows the furnace gases to flow countercurrent to the ore in the liquid and solid state so as to provide for more efficient heat transfer from the ascending furnace gases to the burden.

It is another object of the invention to provide a method and apparatus for blast furnace ore reduction wherein the ore is introduced into the furnace through a central stack in which it is reduced and preheated by upwardly flowing gases, flux forming limestone is introduced into the furnae through a separate supplemental stack and is decomposed with the slag flowing into contact with the ore in a combustion chamber at the bottom of the ore stack, fuel being introduced into the combustion chamber by means of a hot air stream directed tangentially into the chamber and being oxidized so as to produce a flow of gas into the stack at the open bottom end thereof with the gas moving upwardly through the burden, and with the ash from the coke being trapped in a separate trough which prevents comingling thereof with the slag formed by the decomposed limestone and the melted ore.

These and other objects and advantages of the invention will be understood when considered in connection with the blast furnace illustrated in the accompanying drawings wherein:

FIGURE 3 is a partially vertical section similar to FIGURE 1 illustrating a modified form of furnace; and FIGURE 4 is a cross section taken on the line 4—4 of FIGURE 3.

Figure 1:
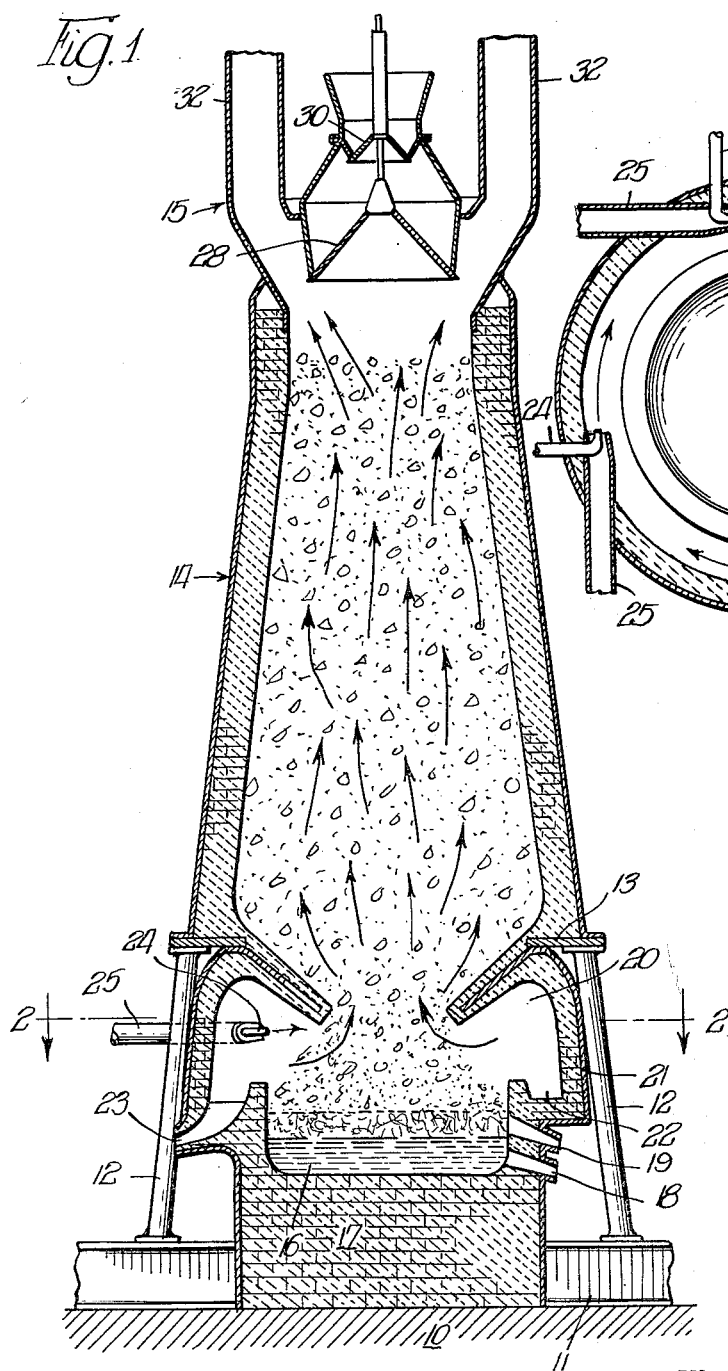
FIG. 1 is a vertical section taken through a blast furnace which incorporates therein the principal features of the invention, portions of the furnace being shown more or less schematically.
Figure 2:
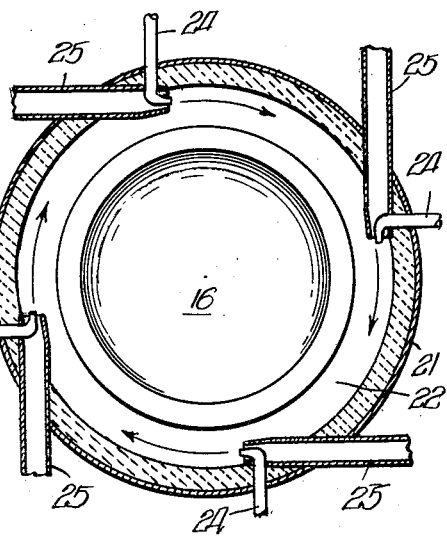
FIG. 2 is a cross section, partially schematic, which is taken on the line 2—2 of FIG. 1.

Referring to FIGURES 1 and 2 of the drawings, there is illustrated a blast furnace which is adapted to produce pig iron from iron ore, coke and a flux forming limestone or the like.

The furnace may be constructed of the same materials which are commonly employed in the construction of a conventional blast furnace and the same engineering principles may be employed with the furnace having a stack and top of conventional structure and differing from conventional construction in the arrangement provided in the bosh and hearth sections below the stack.

The furnace comprises a foundation 10 which is preferably reinforced masonry and which includes around its outer periphery a base 11 for a plurality of peripherally spaced, upstanding columns 12 on the upper ends of which a mantle 13 is supported, the latter carrying the stack 14 and the top structure 15 of the furnace. The hearth which is indicated at 16 is lined with fire brick or other suitable insulating material as indicated at 17, and is provided with a tapping hole or iron notch 18 for drawing off the molten metal and a slag notch 19 for drawing off the slag which, of course, accumulates in layered relation with the iron in the hearth. The bosh area of the furnace which extends from the hearth to te mantle 13 is constructed so as to provide a cylindrical compartment or camber 20 having an outer wall 21 lined with suitable insulating material. The chamber 20 has a maximum diameter substantially greater than the diameter of the hearth and the outer wall extends upwardly and inwardly providing a reversely curved cross section at the top as shown. The top edge of the chamber 20 terminates at the bottom edge of the stack 14, leaving a bottom opening in the stack through which the burden descends. A trough 22 is provided at the lower edge of the wall 21 which is separated from the hearth 16 and in which the coke ash is allowed to accumulate. The trough 22 is provided with an opening 23 for drawing off the coke ash from time to time.

The chamber 20 forms a combustion chamber for burning most of the fuel which is introduced into the chamber through a series of peripherally spaced nozzles 24 which extend through the furnace wall 21 into the chamber 20. The inner end of each nozzle 24 terminates at the end of one of a second set of nozzles or tuyeres 25 which are mounted also around the periphery of the chamber 20. The nozzles 25 are arranged tangentially relative to the chamber wall 21 so that preheated air may be delivered therethrough in a tangential direction relative to the inner wall of the furnace area 20. A majority of the coke which serves as fuel for the furnace is introduced through the nozzles 24 and circulated around the combustion chamber 20 by the hot air blast delivered through the associated nozzles 25.

In operation, ore, limestone and a relatively small amount of metallurgical coke are fed into the stack 14 through the bells or hoppers 28 and 30 and settles down towards the hearth 16. The major portion of the fuel, consisting of a fine, fragile coke, char or coal, is introduced with preheated, high pressure air or other suitable conveying gas, at a plurality of points around the combustion chamber 20. The coke is delivered through the nozzles 24 by a suitable conveying gas and impinges on the inside face of the wall 21 due to the air blast through the nozzles 25 where it tends to stick to the layer of slag which is built up on the wall. The preheated air delivered through the nozzles 25 sweeps past the coke and oxidizes it to carbon monoxide. The ratio of fuel and air may be regulated to produce the desired amount of the carbon monoxide. The products of combustion, mainly carbon monoxide nitrogen pass through the bottom opening in the stack and enter into and ascend through the burden to the top of the furnace with the gases finally being taken off through the gas uptake pipes 32. As the ore, limestone and metallurgical coke descend in the furnace stack, the ore is reduced, the limestone is decomposed, and both are heated and melted, with the heat being supplied by the ascending hot gas. The metallurgical coke that is charged into the top of the furnace does not melt and is not affected by the ascending furnace gases. This coke descends to the base of the furnace and accumulates in the slag in the hearth 16. The molten iron and slag drips down through the interstices in the coke to the heart and the slag settles on the top of the iron due to the lighter density of the same, both being drawn off through the slag notch 19 and iron tapping hole 18. The ash from the fuel or fine coke which is burned in the chamber 20 is accumulated in the trough 22 and drawn off through the hole 23 so that this material, which may contain substantial amounts of sulphur and other undesirable impurities, does not come into contact with the iron but is tapped out of the furnace separately. This permits the use as a fuel of a much lower grade coke, char or coal than can be otherwise used without the impurities affecting the quality of the iron.

A modified form of furnace is illustrated in FIGURES 3 and 4. In this form of the furnace, provision is made for feeding the limestone in secondary stacks which are separated from the main stack in which the ore is fed. The furnace in this form of the invention may be constructed of conventional materials and following in general the same engineering principles employed with respect to the furnace of FIGURE 1.

In the modified form of the furnace, the main stack 40 in which the ore is reduced and preheated, terminates at its lower end above the center portion of he hearth 41 which is built up on the foundation 42. Supplemental stacks 43 and 44 extend upwardly of a bosh or section 45 which provides a circular combustion chamber 46 having an inverted trough shaped cross section with an inner wall 47 slanting downwardly and inwardly and terminating at the lower edge of the main stack 40 and an outer wall 48 slanting downwardly and outwardly. The limestone stacks 43 and 44 have bottom openings 49 and 50 which form passageways into the combustion chamber or primary furnace chamber 46, the openings 49 and 50 extending through the curved inner wall 47 of the bosh section 45 so that the slag formed by the melting limestone drains down inside of the wall 47 as indicated at 52 and onto the bottom portion of the burden which is supported in outwardly spread relation on the hearth 41. The outer wall 48 of the bosh section 45 is formed with its bottom edge terminating at a relatively shallow, inwardly extending gutter forming portion 53 which surrounds the top portion of a secondary furnace section indicated at 54, the latter having an outer wall 55 with a top portion 56 slanting outwardly and downwardly and with a vertically extending bottom portion 57 forming the outer wall of a trough 58 in which the melted metal and slag are accumulated. The trough 58 extends around the periphery of the hearth 41 and the melted metal and slag descending from the burden are accumulated in layers according to the difference in density of the material.

The primary combustion chamber 46 receives the fuel, which may be a fine, low grade coke, char or coal, and which is introduced into the combustion chamber 46 through a series of peripherally spaced nozzles 60 which are arranged to deliver preheated high pressure air and coke, char or coal into the chamber 46 tangentially thereof so that the coke, char or coal tends to stick to the slag built up on the inside of the outer furnace wall 48 where it is oxidized to $CO_2$ and CO by high velocity preheated air sweeping past the surface thereof. The ash from the fuel flows down the inside face of the wall 48 and is accumulated in the trough 53 from which it may be removed by a tap 61. A second series of peripherally spaced nozzles 62 are arranged adjacent the nozzles 60 to deliver preheated high pressure secondary air into the top of the chamber 46 to insure complete combustion. A third set of nozzles 63 are provided in what may be termed the secondary furnace area 54. The nozzles 63 are adapted to deliver a small amount of additional fuel and partially reduced ore fines tangentially into this area of the furnace. This material is caught up in the flow of gases created by the nozzles 60 so that the materials are impinged on the inside face of the wall 56 due to centrifugal force and are reduced and melted by the heat of the gases produced by the fuel. The gases $CO_2$ and $CO$ which result from the oxidation of the coke travel upwardly through both the central ore stack 40 and the limestone stacks 43 and 44 as indicated. The gases rising through the limestone stacks will be completely oxidized to $CO_2$. Some of the $CO_2$ produced in the primary furnace area or combustion chamber 46 may be reduced to $CO$ by the fuel entering the secondary furnace area 54 through the nozzles 63. By controlling the proportions of the air, fuel and ore fines, the temperature and the composition of the gases entering the ore stack 40 at the base of the burden can be adjusted to produce the desired reactions with the ores. The melted ore flows through the slag and the metal and slag accumulate in layers in the trough 58 and are drained off through the taps 64 and 65 provided for that purpose.

In the operation of this form of furnace the ore and a small amount of coke are fed into the top of the stack 40. The limestone is fed separately into the supplemental stacks 43 and 44. A major portion of the fuel for combustion (coke, char, coal, oil or gas, etc.) and preheated primary air is introduced through the nozzles 60 at a plurality of points tangentially into the primary furnace chamber 46. The fuel impinges on the primary furnace wall 48 and sticks to the layer of slag built up on the wall through oxidation of the fuel. The preheated air sweeping past the fuel oxidizes the fuel to $CO$ and $CO_2$. The secondary air entering through the nozzles 62 at the top of the primary furnace chamber 46 oxidizes the gases entering the limestone stacks to $CO_2$. The limestone in the separate stacks is preheated and melted by the ascending countercurrent flow of gases. The fuel ash drains down the outside wall of the primary furnace chamber 46 as a slag and is collected in the trough 53 from which it is drained through the tap 61, so that the residue from the burning of the fuel does not comingle with the slag produced from the impurities in the ore and limestone.

Gases resulting from combustion in the primary furnace chamber 46 enter the secondary furnace chamber 54 with a high rotary velocity. Some additional fuel and ore are introduced into the secondary furnace chamber 54 in a tangential path through the circumferentially spaced nozzles 63. The gases from the primary furnace chamber are reduced by the fuel to the desired mixture of $CO_2$ and $CO$. The ore fines impinge and stick to the slag on the secondary furnace wall where they are reduced and melted by the high velocity secondary furnace gases.

The burden in the stack 40 is preheated, reduced and elevated in temperature by the ascending countercurrent flow of gases entering from the secondary furnace. The ore is melted and the metal flows down onto the hearth and into the trough 58 along with the slag which results from the flow of melted limestone down the wall 47, the impurities in the melted ore mixing with the molten limestone and forming the slag.

The furnace is adapted to use low cost coke, char or coal as fuel which results in lower operating costs. The limestone is preheated, decomposed and fused with very high temperature gases completely oxidized to $CO_2$ resulting in lower fuel requirements. Also, in heating the limestone separately the $CO_2$ resulting from decomposition is not necessarily converted to $CO$ which, in a conventional furnace, absorbs some of the fuel.

The composition of the gases entering the ore body in the stack 40 from the furnace chamber 54 can be regulated so that the ore can be subjected to the maximum amount of $CO_2$ with more efficient fuel utilization. Also, the primary furnace chamber 46 contains very high temperature gases completely oxidized to $CO_2$ which will reflect radiant heat on the surface of the ore body at the bottom of the stack, some of which will be absorbed by the ore resulting in more efficient utilization of fuel.

The furnace provides for conversion of a major portion of the ash or residue resulting from the burning of the fuel to a slag which is tapped off separately in the primary furnace chamber and undesirable impurities in this slag do not contaminate the iron so that a fuel having larger amounts of impurities than normally permitted in blast furnace operations can be used.

In both forms of the furnace illustrated, the air and fuel are introduced in a manner which permits complete reduction of the air to carbon monoxide before the gases come into contact with the metallurgical coke introduced at the top of the furnace. Since carbon monoxide is inert to carbon at any temperature, only a very small quantity of metalurgical coke will be consumed which affords an advantage over previously proposed furnace designs in which fuel and air are blown into direct contact with the coke descending in the ore stack.

In both forms of the furnace the incoming solid fuel sticks to the slag on the furnace wall and the relative velocities between the air and fuel are very high so that there is a rapid chemical reaction. Also, the slag built up on the furnace wall is an excellent insulating medium which helps maintain the temperature in the hearth at a high level because the sensible heat loss through the furnace walls is held at a minimum. Maintaining the highest possible temperature levels in the hearth is, of course, desirable from an efficiency and high output standpoint.

I claim:

1. In a blast furnace, a vertical stack for receiving a burden of iron ore, fuel and slag forming material, means forming a hearth below the bottom end of the stack, said stack having a bottom opening which is smaller than the hearth and which is spaced above the hearth so that the burden spreads out on the hearth as it descends through the bottom opening in the stack, a circular combustion chamber surrounding the hearth and the bottom portion of the stack, said combustion chamber having an open inner side communicating with the opening in the bottom of the stack, means for delivering a mixture or high velocity air and a relatively fine solid fuel into said combustion chamber in a direction tangentially to the outer walls of said combustion chamber so as to circulate in a circular path in said combustion chamber, and a slag trough at the bottom of the outside wall of the combustion chamber which is separated from the hearth for collecting the slag formed by burning the fuel in the combustion chamber without mixing the fuel slag with the slag formed from the materials in the stack.

2. A blast furnace comprising a vertical stack for receiving a quantity of iron ore, means forming a hearth below the bottom end of the stack, said stack having a bottom opening which is of smaller area than the hearth area and which is spaced above the hearth so that the burden spreads out on the hearth as it descends through the bottom opening in the stack, means forming a circular combustion chamber of inverted trough shaped section surrounding the bottom of the stack with an inner wall having an uppermost portion terminating at the bottom opening of said stack and defining the upper edge of an opening from said combustion chamber into said hearth, a separate vertical stack for receiving a quantity of slag forming material which has a bottom opening on the inner wall of said combustion chamber so that the slag will drip down said inner wall and mingle with the ore descending through the bottom of the stack, means for delivering a mixture of preheated high velocity air and a relatively fine fuel into said combustion chamber in a direction tangentially to the outer wall thereof so as to circulate in one direction throughout said combustion chamber, and a slag trough at the bottom of the outer wall of the combustion chamber for collecting the slag formed as a result of the burning of the fuel in the combustion chamber without commingling with the slag and molten iron descending from the stacks to the hearth.

3. A blast furnace comprising a vertical stack for receiving a quantity of iron ore, a hearth spaced below the bottom end of the stack, said stack having a bottom opening which is of smaller area than the area of the hearth and which is spaced above the hearth so that the material in the stack spreads out over the hearth as it descends through the bottom opening in the stack, a circular combustion chamber extending around the bottom of the stack above the hearth and having an inner wall portion extending upwardly and outwardly of the bottom opening of said stack, said combustion chamber having an open inner wall portion in the space between the hearth and the bottom opening in the stack, one or more supplemental vertical stacks for slag forming material extending above said combustion chamber with a bottom opening at the top of said inner wall, means for delivering a mixture of high velocity air and a relatively fine solid fuel tangentially into said combustion chamber and to move the same in a continuous circular path in the combustion chamber so as to form high temperature gases which pass through the open inner wall of the combustion chamber and ascend through the material in the stacks, and a relatively narrow slag trough at the bottom of the outer wall of said combustion chamber for collecting the slag formed by the burning of the fuel in said combustion chamber without permitting the same to comingle with the molten iron and slag descending from the stacks to the hearth.

4. A blast furnace as recited in claim 3, and means forming a secondary chamber surrounding the hearth below the combustion chamber and open on its inner side so as to communicate with the opening in the inner wall of the combustion chamber and the bottom opening in said stack, and means for delivering a mixture of preheated high velocity air and fine fuel tangentially into said secondary chamber so as to move the air and fuel in a continuous circular path in said secondary chamber.

5. In a blast furnace, a vertical stack for receiving a quantity of iron ore, fuel and slag forming material, means forming a funnel-like opening at the bottom end of said stack, means forming a hearth below the bottom end of the stack, the bottom opening of said stack being of smaller area than the hearth area and being spaced above the hearth a sufficient distance for the material in the stack to spread out on the hearth as it descends through said stack opening, means forming a circular combustion chamber extending around the bottom portion of the stack, means including a series of nozzles in paired relation and spaced about the peripheral wall of the combustion chamber for delivering preheated high velocity air and a fine fuel into said combustion chamber, said nozzles each delivering the air and fuel in the same direction tangentially to the outside walls thereof so that a slag is formed on said walls as said fuel is burned, and a narrow slag trough at the bottom of the combustion chamber which is spaced outwardly of the hearth for separately collecting the slag formed as a result of the burning of the fuel in the combustion chamber.

6. In a blast furnace, a vertical stack for receiving a mixture of iron ore, fuel and slag forming material, means forming a hearth below the bottom end of the stack, said stack having a funnel-shaped bottom opening which is spaced above the hearth so that the material in the stack descends onto the hearth through the bottom opening in the stack, means forming a circular combustion chamber around the bottom portion of the stack and opening on its inner side into the space between the hearth and the bottom opening in the stack, means including a plurality of nozzles each nozzle positioned for discharging in a tangential direction against the inside wall of the combustion chamber a high velocity air and a relatively fine fuel forming material so that the air and fuel travel in a continuous circular path and the residue from the combustion of the fuel forms a liquid slag on the chamber wall and the gases produced are free to pass through the open inner side of the combustion chamber and the bottom opening in the stack and rise through the stack, and a slag trough at the bottom of the combustion chamber which is separated from the hearth for collecting the liquid slag formed by the burning of the fuel so that the slag from the fuel and the products resulting from the reduction of the ore are not commingled.

7. A process for the production of molten metal which comprises preheating, reducing and raising the temperature of a mixture of ore and slag forming material in a vertical column by means of a countercurrent flow of gases produced by delivering a mixture of preheated high pressure air and relatively fine solid fuel tangentially into a circular combustion area completely surrounding an exposed portion of the mixture at the base of the column and regulating the amount of fuel and air and confining the same to movement in a continuous circular path while the fuel is burned so as to produce high temperature gases which are forced from the combustion area by the incoming air to ascend through the mixture in the column, centrifugally separating the residue from the burning of the fuel and accumulating the separated residue from the burning of the fuel separately from the slag and metal resulting from the melting of the ore.

8. A process for the production of pig iron which comprises supporting a mixture of iron ore, coke and limestone in a vertical column, introducing preheated high temperature air and a quantity of a relatively fine coke into a cylindrical combustion area completely surrounding an exposed portion of the material in the bottom of the column, the air and the coke being introduced at circumferentially spaced points and in a direction tangentially to the outside periphery of the combustion area so that there is movement of the air and fuel in a continuous circular path extending about the bottom of the column and the fuel is burned to produce high temperature gases which are forced from the combustion area by the incoming air to move upwardly through the material in the column, introducing additional preheated high pressure air into the uppermost portion of the combustion area to insure complete combustion of the fuel, introducing a smaller quantity of high pressure air, coke and partially reduced ore fines into a secondary cylindrical combustion area which is located below and communicates with the primary combustion area, at a plurality of points and tangentially to the outer periphery of the secondary combustion area so as to burn the fuel and produce gases which comingle with the gases produced in the primary combustion area and ascend through the material in the column whereby the material in the column is melted and descends by gravity, centrifugally separating the residue from the burning of the fuel and collecting the separated residue from the burning of the fuel separately from the melted ore and limestone.

References Cited in the file of this patent

UNITED STATES PATENTS

| | | |
|---|---|---|
| 846,216 | Kemp | Mar. 5, 1907 |
| 1,381,689 | Anderson | June 14, 1921 |
| 1,735,293 | Murakami | Nov. 12, 1929 |